United States Patent [19]
Hauff et al.

[11] Patent Number: 5,769,626
[45] Date of Patent: Jun. 23, 1998

[54] EVACUATION SYSTEM WITH EXHAUST GAS CLEANING AND OPERATING PROCESS FOR IT

[75] Inventors: Alfred Hauff; Volker Kinzig, both of Gelnhausen, Germany

[73] Assignee: Ebara Germany GmbH, Hanau, Germany

[21] Appl. No.: 637,869

[22] Filed: Apr. 25, 1996

[30] Foreign Application Priority Data

Apr. 25, 1995 [DE] Germany .......................... 195 15 145.3
Mar. 21, 1996 [EP] European Pat. Off. .............. 96104466

[51] Int. Cl.⁶ .............................. F04B 23/02; F27D 17/00
[52] U.S. Cl. ............................ 432/72; 417/201; 417/203; 417/205; 418/201.1
[58] Field of Search ..................... 432/72, 152; 417/201, 417/203, 205; 418/201.1; 34/92

[56] References Cited

U.S. PATENT DOCUMENTS

| | | | |
|---|---|---|---|
| 3,786,130 | 1/1974 | Baker | 423/245 |
| 4,797,068 | 1/1989 | Hayakawa et al. | 417/201 |
| 4,954,047 | 9/1990 | Okuyama et al. | 417/205 |
| 5,259,735 | 11/1993 | Takahashi et al. | 417/203 |
| 5,443,644 | 8/1995 | Ozawa | 418/201.1 |
| 5,564,907 | 10/1996 | Maruyama et al. | 418/201.1 |

FOREIGN PATENT DOCUMENTS

| | | |
|---|---|---|
| 061074 | 9/1982 | European Pat. Off. . |
| 0303368B1 | 2/1989 | European Pat. Off. . |
| 0346893B1 | 12/1989 | European Pat. Off. . |
| 4314942A1 | 11/1994 | Germany . |

Primary Examiner—Henry A. Bennett
Assistant Examiner—Gregory Wilson
Attorney, Agent, or Firm—Stanley Z. Cole

[57] ABSTRACT

An evacuation system (1) with exhaust gas cleaning, consists of at least one vacuum pump unit (4) and at least one cleaning unit (10) in series as to enable the continuous flow of fluid media supplied by the vacuum pump unit (4). In order to prevent condensates in a gas connection pipe (9) and in order to decrease the surface area, the at least one vacuum pump unit (4) and the at least one cleaning unit (10) are compressed into substantially one component, and the gas connection pipe (9) which runs between the vacuum pump unit (4) and the cleaning unit (10) is run in the shortest possible path and is, as a result, kept at a temperature which is above the condensation temperature of constituents in the fluid media capable of condensation, essentially without the addition of external heat, with only the compression heat of the vacuum pump unit (4). Further, a central control unit (16) for the vacuum pump unit (4) and the cleaning unit (10) can be placed over the at least one vacuum pump unit (4). In operation, the cleaning unit (10) is operated with an input temperature of the fluid media of at least 80° C., and preferably of at least 160° C.

15 Claims, 2 Drawing Sheets

EVACUATION SYSTEM WITH EXHAUST GAS CLEANING AND OPERATING PROCESS FOR IT

BACKGROUND OF THE INVENTION

The invention concerns an evacuation system for cleaning of exhaust gases with constituents which can be condensed above room temperature, and through the use of at least one vacuum pump unit for the generation of a pressure difference with at least a factor of 5 between an intake pipe inputting to the vacuum pump unit and a gas connecting pipe connecting the output of the vacuum pump unit to at least one cleaning unit placed in a position following the connecting pipe, with at least one device from the group of absorbers, incineration furnaces, gas scrubbers, gas reactors and neutralizers for the fluid media supplied by the vacuum pump unit as part of the cleaning unit which exhausts to an exhaust pipe.

Such evacuation systems are known. They are used, for example, in manufacturing facilities in the semi-conductor industry in which a whole series of toxic and reactive gases are employed. Thus, for example, in the chemical vapor deposition process, so-called CVD, gases such as certain silicon hydrides, phosphorous hydrides, boron hydrides, TEOS are used. In the dry etching process, a whole series of fluorine and chlorine compounds may be used. Since the processes involved are carried out under vacuum, gases of with the above-mentioned constituents are constantly drawn off.

Since these represent a substantial hazard to the environment, the exhaust gases from the vacuum pumps must be cleaned, for which purpose a whole series of exhaust gas cleaning processes and systems are available.

As vacuum pumps, oil sealed, rotary sliding vane compressors, dry sealed vacuum pump such as claw pumps, rotary piston pumps, screw compressors and the like are preferably used. Before such vacuum pumps can also be placed other vacuum pumps which operate in lower pressure ranges.

It is known how to use, following such vacuum pumps, exhaust gas cleaning systems in which the following cleaning processes are carried out:

Conversion of the gases into salts in such a manner that the gases are converted to an inert solid, Incineration and scrubbing of the gases with subsequent neutralization so that the original gases can be converted into dissolved solids and disposed of, The adsorption of the gases into special adsorption beds which bind the gases to their surfaces and are enclosed in canisters or cartridges (for example, activated charcoal or zeolite).

It is also known in the prior art that for example the output of multiple production facilities for the manufacture of semi-conductors may be connected to manifolds. Since the production processes in the individual production units do not run synchronously, gas mixtures are formed in the manifold whose components react with each other and form new, sometimes harmful, compounds.

At the current state of technology, there are, however, between the vacuum pumps or vacuum pump sets and the cleaning devices, long pipes whose length can be up to 15 meters or more. As a result, enormous heat losses are involved, so that the piping cools below the dew point of the components capable of condensation. This has the disadvantage that at least a part of the gases condense in the piping involved, and is sublimated at a later time. This leads not only to substantial maintenance and cleaning costs, but also to hazards for employees who clean these systems. Especially hazardous in this regard are certain fluorine compounds which react with the humidity in the air to form hydrofluoric acid, which is found in liquid form in the piping systems described. Even a single drop of hydrofluoric acid can lead to substantial burning of the skin; in addition, vapor and gaseous fluoride compounds represent a substantial danger to the respiratory system.

In part, the above described condensation of harmful materials in the piping was accepted because it made the output gas appear cleaner.

This type of cleaning of the piping, however, results in a substantial risk for the environment, personnel and for the installations, since the condensates sometimes lead to leaks in the flange connections and even to the pipes being eaten through. Further, backward diffusion of exhaust gases into the vacuum pumps has been observed in which, for example, the dry pump process has been substantially damaged.

In the end, on the one hand the vacuum pumps, and on the other hand the gas cleaning systems, need independent spaces for installation, which leads to a substantial increase in the investment costs of such installations, not to mention the fact that in some cases appropriate installation spaces at a suitable location are not available. This leads to a substantial increase in the length of the piping systems which are already of a length to be troublesome.

Through DE 43 14 942 A1, it is known to place a separator and a suction fan on a single support where the suction fan is placed after the separator. Such an arrangement is not suitable for a vacuum operation or system because, as a result of using a suction fan, only moderate pressure decreases can be achieved. In this arrangement of separator and suction fan, dirtying the connecting pipes does not arise as a problem.

A problem with the prior art which this invention solves is to provide an evacuation system in which the formation of condensates with the consequences described above is either avoided or is at least, reduced substantially and which requires a substantially smaller installation area

SUMMARY OF THE INVENTION

The solution to this problem is carried out by an evacuation system as initially described herein, in accordance with the following characteristics:

a) combining the at least one vacuum pump unit and the at least one cleaning unit into a single component, and b) limiting the gas connecting piping to a length in which the gas connecting piping is, at least, substantially without the addition of outside heat, capable of being kept at a temperature above the condensation temperature of the components which are capable of being condensed, by the heat of compression of the vacuum pump unit.

The combining of at least one vacuum pump unit on the one hand and at least one cleaning unit on the other hand as a single component leads to an extremely compact construction, and substantially shortens the gas connecting pipe between the vacuum pump unit and the cleaning unit.

Consequently, and in general, added heat (the positive addition of heat) to be applied to the gas connecting piping and subsequent piping and valves up to the cleaning unit can be dispensed with. It is, however, advantageous to provide these pipes, etc. with a thermal isolation wrapping in order to support the effects of the gas heating through the vacuum pump unit, so that in every case condensation of harmful or toxic substances is prevented to the greatest extent possible.

In this regard, it is especially advantageous if the vacuum pump unit and the cleaning unit share a common support base or chassis.

The expression "common chasis" does not necessarily mean that what is involved must be a single frame or support. Rather, it is perfectly possible to make up the basic frame from smaller partial frames or supports. This is in substantial contradiction to the state of technology in which individual frames or support for the vacuum pump on the one hand and for the cleaning unit on the other hand are completely separated from each other and set up at different locations. The dimensions of such—horizontal—basic frames or supports are preferably between 400 millimeters to 1200 millimeters×450 to 1300 millimeters, respectively 40 centimeters to 120 centimeters×45 to 130 centimeters.

Extremely short piping leads to two advantages which are supportive of each other: for one, only very small surfaces are available for the condensation of harmful substances, and small volumes for the collection of any liquid condensate. On the other hand, the relatively high gas temperatures at the output of the (last) vacuum pump results in heating or keeping hot the gas connecting pipes at temperatures at which no or only a negligible amount of condensation take place. These output temperatures lie in general between 80° and 240° C.

The expression "essentially without adding heat from outside" means that as a rule outside heating of the gas connecting piping can be dispensed with, namely if the dew point of the components capable of condensing is correspondingly low and the output temperature of the exhaust gases from the pumps lies above the dew points. By using pumps with low output temperatures and/or gas components with high dew points, it may be necessary to use external heating of the gas piping from the pump to the cleaning unit.

An example may clarify this: in the case of a 20 meters long pipe, in accordance with the state of technology which, due to resistance to flow, must also have a correspondingly large cross-section, a thick wall and a large surface, an enormous amount of heat must be applied to the pipe by means of a heating mantle, in connection with which, during the start-up, the mass problem must be taken into account (cold start).

Without outside heating, the dew point cannot be exceeded over the entire length of the pipe due to the very small mass flow of gases.

In the device in accordance with the invention, the maximum length of the gas connecting pipe is approximately 2 meters, reducing the length by at least 90% and, due to the small resistance to flow, its cross-section, its wall thickness and the surface can be kept clearly smaller so that the mass problem in the case of a cold start plays a secondary role. If we add heat to the pipe we can reduce the amount of heat added by more than 90%, if it is needed at all. The heating up in the case of a cold start, by means of the exhaust gases, is possible in a substantially shorter time and it can be achieved through short-time pumping of compressed air which is completely impossible in the state of technology.

The smaller pipe cross-section which is possible in the case of the invention, also makes possible a higher rate of flow, so that the static pressure rises relatively and the danger of condensation of harmful substances is further reduced.

What is involved here is a synergistic effect: the hot exhaust gases leaving the vacuum pump unit arrive by the shortest possible path in the shortest time and at a very high temperature in the cleaning unit. In case of a cold start, the condensation risk can be prevented by bringing the gas connecting pipe to the desired temperature using air and only then introducing the exhaust gases with the harmful substances into the gas pipe.

The support base for the installation is not larger or at least not substantially larger than the support base for previously known vacuum pumps and, as a result, it is possible to install the evacuation system in accordance with the invention on a surface which would previously have been suitable for the installation of one or more vacuum pumps alone.

In this regard, it is an additional advantage if the common support base is formed as a movable chassis. As a result, it is possible, in case of a breakdown or an inspection, to modularly separate not only the vacuum pump but also, together with it, the cleaning unit from the production installation to which it is attached, and replace it with a modular replacement unit which has the same design and the same advantages.

As a further improvement, if the vacuum pump and the cleaning unit are arranged within an imaginary square whose horizontal cross-section is determined by the outside perimeter of the basic frame or support. As a result, it is possible to supplement the basic frame with vertical supports and horizontal beams as to support housing walls so that the entire aggregate can be produced as an enclosed unit.

It is further advantageous if the one or more vacuum pump are controlled through a central unit for the vacuum system and for the cleaning unit. In an especially advantageous manner, there is assigned to the control unit a user interface, a display, to show some of the operating parameters of the vacuum pump and cleaning unit in connection with which this control unit also can contain a control device for further functions such as, for example, for the rinsing of the vacuum pump with an inert gas.

In this regard, it is especially advantageous if the vacuum pump unit—if applicable as the last stage—has a three-bladed dry rotor pump which works in the pressure range between $10^{-2}$ mbar and 1100 mbar.

Such a three-bladed dry rotor pump—which is a known device—has the following characteristics and advantages:

1. Gases with high output temperatures and
2. Uniform pressures with small variations.

The use of such a pump in accordance with the invention, as a result of its integration into the single component with the cleaning unit, leads to the already named advantages and also promotes the operating process of the cleaning units involved, especially in the case of combustion furnaces which work with a flame.

Furthermore, the use of exhaust mufflers can be dispensed with.

This has the additional advantages that the exhaust gas path is kept to a minimum and not expanded by passage through the muffler and its inner surfaces. The power loss is therefore less, and a cleaning point with potential hazards is removed since a muffler would be a device in which the condensation of harmful materials would occur preferentially.

This is especially the case if—regarded in the directions of flow of the exhaust gases—a roots pump is placed as the first stage before the three-bladed dry rotor pump. Which operates in a pressure range between $10^{-3}$ mbar and 10 mbar.

It is further advantageous if a switch-over valve is placed in the gas connecting piping through which the exhaust gases can be fed optionally to the combustion furnace and the exhaust gas pipe. This makes it possible to continue the operation of the installation during a replacement of the cleaning unit.

The cleaning unit can advantageously consist of at least one device from the group absorbers, combustion furnaces, gas scrubbers, gas reactors and neutralizers.

The invention also covers an operating process for the above-described evacuation system. In order to solve the same problem, it is provided that the cleaning unit is operated with an input temperature of the fluid medium of at least 80° C., and preferably of at least 160° C.

BRIEF DESCRIPTION OF THE DRAWINGS

Two sample embodiments of the invention are described in greater detail on the basis of FIGS. 1 and 2.

The following is shown.

DETAILED DESCRIPTION

Figure 1:
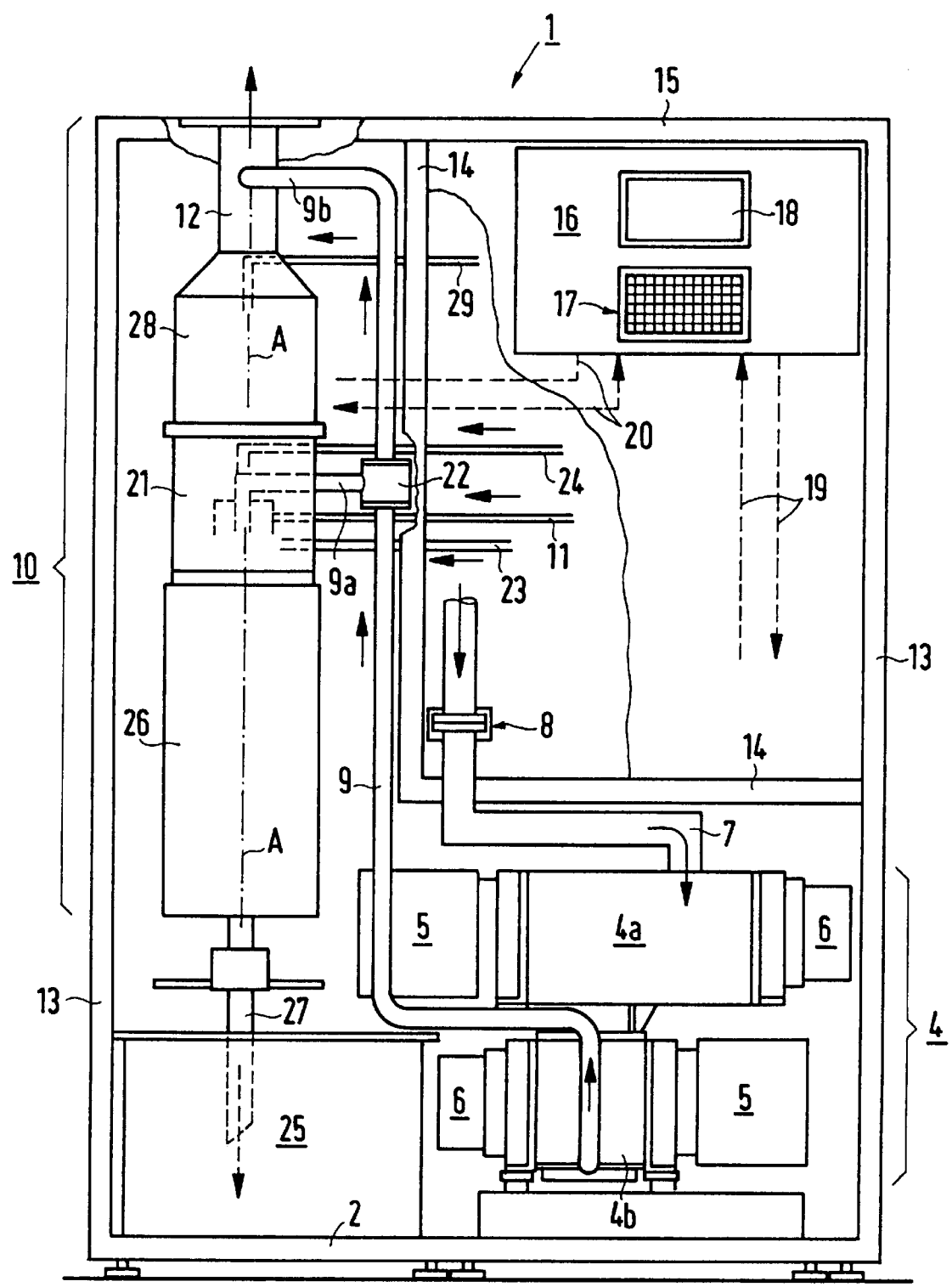
FIG. 1 is a schematic partially cut-away frontal view of the evacuation system in accordance with this invention.

In FIG. 1, an evacuation system 1 is represented as positioned, on a rectangular horizontal frame 2, a vacuum pump unit 4 is attached, consisting of a series arrangement of a roots pump 4a and a three-bladed dry rotor pump 4b. These are driven by an electric motor 5 and a gear box 6, which are integral components of the vacuum pumps 4a and 4b.

The vacuum pump unit 4 includes an intake pipe 7, which is connected through a pipe coupling 8 to a manufacturing facility or installation for the manufacture of semi-conductor components which is not shown. The pressure side of the vacuum pump unit 4 is connected through a gas pipe 9 to a cleaning unit 10, which in this case is equipped as a combustion furnace with a burner and a vertical main axis A—A. The design of a such a cleaning unit is explained in greater detail below, so that the internal design details given above are only indicative. The combustion gas is brought in through a pipe 11 and the cleaned exhaust gases in compliance with legal requirements of the "threshold level value" for air are released to the atmosphere through an exhaust gas pipe 12 either immediately or through a manifold not shown here.

The base frame 2 is supplemented by four braces or posts 13, an intermediate frame 14 and an upper frame 15 in a transportable design which at least in its area between the base frame 2 and the intermediate frame 14 can be closed in by wall elements which are not shown. It should be recognized that the vacuum pump unit 4 and the cleaning unit 10 are placed inside an imaginary rectangle whose horizontal cross-section is determined by the outside perimeter of the base frame 2 and the vertical braces 13.

The cleaning unit 10 has a combustion furnace 21 in which the gas feed pipe 9 empties through a switch-over valve 22 and a pipe segment 9a. The combustion gas is brought in through pipe 11. A pipe 23 serves to feed in combustion air in a quantity such that the combustion takes place with an excess of oxygen. Through a further pipe 24, a washing liquid, for example potassium hydroxide (KOH), is added and by means of a cone nozzle which is not shown is sprayed in the shape of a cone. The washing liquid is brought into circulation through a storage tank 25.

In the downward direction, a reaction chamber 26 follows the combustion furnace 21; in the reaction chamber, the combustion gases are further converted using the washing liquid. The washing liquid is finally returned to the storage tank 25 using a drain pipe 27.

The combustion gases finally flow upward and are brought through an aerosol filter 28 in which a further pipe 29 for the addition of the washing liquid from the storage tank 25 opens. On its ends as well, there is a cone nozzle, which is not shown, producing a cone shaped spray of washing liquid.

From the switch-over valve 22, a further pipe segment 9b leads into the gas pipe 12. In normal operation of the device, the pipe segment 9b is blocked off. Only for short intervals of time in which the combustion furnace 21 and/or the reaction chamber 26 are being replaced or cleaned, the exhaust gases can be fed directly to the exhaust gas pipe 12.

Figure 2:
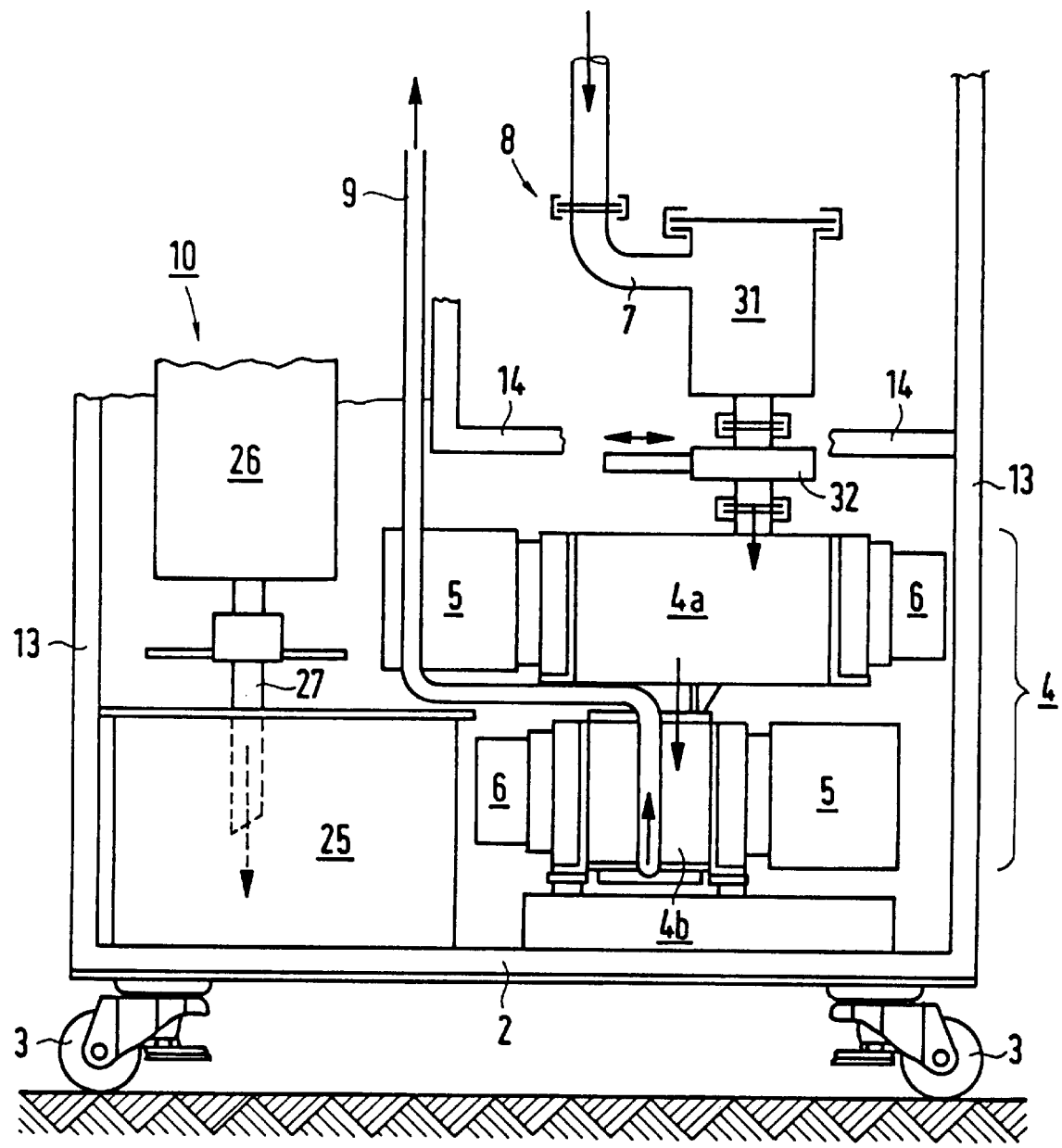
FIG. 2 illustrates another embodiment the lower portion of the apparatus shown in FIG. 1.

FIG. 2 shows that the entire evacuation system can also be provided with wheels 3 in order to facilitate a change in location. Further, inside the component between the pipe coupling 8 and the intake side of the vacuum pump unit 4, a filter 31 and a cut-off valve 32 are placed. This latter has the advantage that the cleaning unit can be replaced or serviced while the vacuum pump unit is running so that it is kept at temperature until a new start-up takes place. As a result, the device is immediately fully ready for operation and condensations of harmful substances inside the vacuum pump unit are prevented. The cut-off valve 32 is actuated by a built-in control unit 16 so that an external control and its wiring can be dispensed with.

The total unit is fully encapsulated so that no significant dirtying is possible.

Above the intermediate frame 14 (FIG. 1), a central control unit 16 is placed, which has an input keyboard 17 and a display device 18. The control unit 16 is connected through a large number of data and control leads 19 to and from the vacuum pump unit 4, and/or associated adjusting devices. The two leads 19 which are drawn in represent all these leads. Through the central control unit 16 and the leads 19, it is, for example, possible to transmit control commands for a motor switch, rinsing gas valves and cooling water valves. And, the position signals are reported to the control unit 15 through the leads 19 and, if necessary, to the indicating interface equipment 18 for display.

Further, the central control unit 16 is connected through a large number of data and control leads 20, of which also only two leads are represented, with the cleaning unit 10. Through the leads 20 can be transmitted, for example, pressure and temperature of the gases in the gas connection pipe 9 to the control unit 16. Similarly signals for flame monitoring, temperature monitoring, water flow monitoring and a weight measuring device are transmitted, or for example, the weight of an absorber cartridge if measured, to determine when it must be replaced. In the other direction, adjusting signals can be transmitted from the control unit 16 for water flow, for heating current switch and for any by-pass pipe for the cleaning unit 10. As a result of this, both the measuring data and the adjustment signals for the individual adjustment units of the cleaning unit 10 can be represented on the display unit 18. Adjustment commands, desired values, etc. can be input through the keyboard 17 into the control unit 16.

As can be seen from FIG. 1, the close spatial arrangement of vacuum pump unit 4 on the one hand and the cleaning unit 10 on the other hand allows the use of a single control device for both units, which also takes up no additional installation space, but rather can be placed on top of the vacuum unit 4. As a result, an extraordinarily compact evacuation and treatment system is achieved which can be replaced with a replacement system in an extremely short time. The operating person has all the data of the pump system on the one hand and of the cleaning unit on the other hand in his field of view so that a monitoring pathway between separate control units can be avoided, as can the running of correspondingly long control and data leads, which would be necessary if the above-described equipment were installed in different locations. If necessary, the central control device 16 can also be supplemented with a plotter or printer in order to provide documentation on the operating parameters.

We claim:

1. A combined evacuator and cleaning system comprising
   a support base;
   a vacuum unit including a vacuum pump mounted on said support base to draw off gases in a cleaning system for a semiconductive manufacturing process; and
   a gas cleaning station connected to said vacuum unit through a relatively short conduit; the length of said conduit being selected based on its capability to maintain a temperature above the condensation temperature of constituents removed by said vacuum unit without the addition of heat beyond the heat of compression of the vacuum unit.

2. A combined evacuator and cleaning system in accordance with claim 1 in which said vacuum unit is capable of generating a pressure difference of at least a factor of 5 between the intake to said vacuum unit and said conduit feeding from said vacuum unit; and, said gas cleaning station comprising at least one cleaning unit selected from the following group: absorbers, incineration furnaces, gas scrubbers, gas reactors and neutralizers.

3. A combined evacuator and cleaning system in accordance with claim 2, characterized in that said cleaning unit shares said support base with said vacuum unit.

4. A combined evacuation and cleaning system in accordance with claim 3, characterized in that said support base is formed as a movable chassis with wheels.

5. A combined evacuation and cleaning system in accordance with claim 3, characterized in that said vacuum unit and said cleaning unit are arranged inside an imaginary rectangle whose horizontal cross section is determined by the outside perimeter of said support base.

6. A combined evacuation and cleaning system in accordance with claim 5, further including an accessible central control unit for said vacuum unit and said cleaning unit within said imaginary rectangular area.

7. A combined evacuation and cleaning system in accordance with claim 5, characterized in that a display unit to display operating parameters of said vacuum unit and said cleaning unit is positioned and disposed at the perimeter of said imaginary rectangle.

8. A combined evacuation and cleaning system in accordance with claim 1, characterized in that said vacuum unit comprises a three-bladed dry rotor pump which operates in a pressure range between $10^{-2}$ mbar and 1100 mbar.

9. A combined evacuation and cleaning system in accordance with claim 1, in which said vacuum unit comprises a roots pump placed before a three-bladed dry rotor pump as a first stage, said first stage operating in a pressure range between $10^{-3}$ mbar and 10 mbar.

10. A combined evacuation and cleaning system in accordance with claim 2 characterized in that said cleaning unit comprises a combustion furnace with a feed pipe for the gas to be cleaned; a combustion feed pipe; an air feed pipe with a feed pipe for a washing liquid; and in which below the combustion furnace, a reaction chamber is provided to place the combustion gases and washing liquid in contact.

11. A combined system in accordance with claim 10, in which a storage tank for a washing liquid is positioned below the reaction chamber.

12. A combined system in accordance with claim 10, characterized in that a switch-over valve is placed in the gas connecting pipe, as a result of which the exhaust gases can be fed optionally to the combustion furnace and the exhaust gas pipe.

13. A process for evacuating and cleaning noxious exhaust gases from a semiconductive manufacturing operation comprising evacuating such exhaust gases including components condensable above room temperature, including generating a pressure difference of at least 5 between an intake pipe and the output of a vacuum unit, flowing said output through an output pipe which is positioned to sequentially follow said vacuum unit and flowing said exhaust gas from said output pipe to at least one cleaning unit placed after said pipe, said cleaning unit being selected from the following group: absorbers, incineration furnaces, gas scrubbers, gas reactors and neutralizers, said output pipe being relatively short and being selected based on a capability to maintain the incoming temperature of the said cleaning unit above about 80° C. as to prevent said components in said exhaust gases from condensation within said output pipe without applying heat to said short output pipe beyond the heat of compression of the vacuum unit.

14. Evacuation system with exhaust gas cleaning for the cleaning of exhaust gases from semiconductor production plants, said exhaust gases containing compounds which can be condensed above room temperature, said system comprising a vacuum unit including at least one vacuum pump for the generation of a pressure difference with at least a factor of 5 between an intake pipe feeding the exhaust gases to the vacuum unit and a gas connecting pipe feeding pump exhaust gases to at least one cleaning unit placed sequentially after said connecting pipe, said cleaning unit comprising a unit selected from the following group: absorbers, incineration furnaces, gas scrubbers, gas reactors and neutralizers for the fluid media supplied by the vacuum unit, said system comprising:

a) a single assembly contained in an enclosed unit having housing walls fully encapsulating the said evacuation system, and b) a gas connecting pipe extending for approximately the shortest possible path between the said vacuum unit and the said cleaning unit whereby the connecting pipe is maintained at a temperature above the condensation temperature of the said condensable components by the compression heat of the vacuum unit and by external heating of the gas connection pipe preventing condensation of condensable compounds contained in the said exhaust gases.

15. The system of claim 8 including means to apply external heat to said short conduit.

* * * * *